United States Patent [19]
Harr
[11] 3,715,481
[45] Feb. 6, 1973

[54] MAGNETIC RECORDING AND REPRODUCTION APPARATUS FOR SINGLE PICTURE VIDEO WITH AUDIO

[75] Inventor: Jerome D. Harr, San Jose, Calif.
[73] Assignee: International Business Machines Corporation, Armonk, N.Y.

[22] Filed: Aug. 2, 1967
[21] Appl. No.: 657,897

[52] U.S. Cl. ....................178/6.6 FS, 179/100.2 T
[51] Int. Cl. ..........................................G11b 5/50
[58] Field of Search ..............179/100.2 T; 178/6.6 A

[56] References Cited

UNITED STATES PATENTS

| | | | |
|---|---|---|---|
| 2,915,595 | 12/1959 | Lyon | 178/6.6 A |
| 3,159,711 | 12/1964 | Schut | 178/6.6 A |
| 3,291,920 | 12/1966 | Hauser | 179/100.2 T |
| 3,308,232 | 3/1967 | Numakura | 178/6.6 A |
| 3,051,777 | 8/1962 | Lemelson | 178/6.6 |

*Primary Examiner*—Bernard Konick
*Assistant Examiner*—Robert S. Tupper
*Attorney*—Hanifin and Jancin and Vincent W. Cleary

[57] ABSTRACT

An audio and visual recorder wherein the magnetic tape is helically wound about a drum which contains a video and an audio magnetic record and playback head for recording and playing back video and audio information obliquely disposed on tracks of the tape. The head scans a first path of the tape while the tape is being held stationary to provide one frame or two fields of video information. Subsequently the audio head scans the video tape selectively and at a much slower speed. In this way, a single picture can be repetitively obtained on a first track at a first speed by the video head and the audio is recorded at a much slower speed to correspond to the single picture on the video track. After the audio track has been completed to its desired length the recording tape is moved longitudinally to a second position for recording a second video track and a second audio track. The cycle then repeats itself so that a first video track is recorded at a relatively high speed and the audio track at a much slower speed is completed.

10 Claims, 4 Drawing Figures

INVENTOR
JEROME D. HARR
BY
ATTORNEY

MAGNETIC RECORDING AND REPRODUCTION APPARATUS FOR SINGLE PICTURE VIDEO WITH AUDIO

BACKGROUND OF THE INVENTION

1. Field of the Invention

Video recording and reproducing systems utilizing magnetic tape helically wound about a drum.

2. Description of the Prior Art

Conventional video recording and reproducing systems utilize a magnetic tape that is helically wound about a rotating drum with the magnetic tape continually moving about the drum while the drum is rotating normally at a much higher speed. The drum contains a video recording and reproducing magnetic head which comes into contact with the tape so as to record and reproduce video information on the tape. This recording produces video tracks which are angularly disposed with respect to the video tape. Normally an audio head is located remote from the drum so as to pick up an audio track which is parallel to the edge of the video tape. When there is audio recording after one frame of video recording, additional tracks of video are recorded and subsequently reproduced so long as the same video picture is employed for the audio. Consequently, normally, considerable redundant video recording is present on all video tapes.

SUMMARY OF THE INVENTION

It is therefore an object of the invention to provide an improved method and apparatus for recording and reproducing video and audio information on magnetic tape records.

A further object of the invention is the provision of a new and improved recording and reproducing method and apparatus for recording and reproducing video and audio signals by utilizing a minimum of tape and with accurate reproduction of the video.

A still further object of the invention is to provide a new and improved method and apparatus for accurately transducing video and audio information with a minimum of redundancy of recording of the video information.

These and other objects of the inventions are realized by a method and apparatus for transducing a video and audio signal wherein a video transducer head is moved along a first path at a first speed in magnetically coupled relationship and angularly disposed with respect to a recording medium. An audio transducer is also employed to record and reproduce audio information. This is done by moving the audio transducer along a second path at a second speed in magnetically coupled relationship and angularly disposed with respect to said recording medium. The speed of the audio transducer, however, with respect to the recording medium is substantially slower than the speed of the video transducer. By this method and apparatus the video information can be recorded initially and subsequently the audio information can be recorded selectively until the audio track is substantially the same length or at a predesired length with respect to the video track. However, in playback, since the recording medium is fixed, the video information can be repeated continually until the audio track has been completed. Thus, contrary to the conventional method, video fields or pictures are not repeated on the recording medium in order to accommodate additional audio information but rather the single video information is repeated thus resulting in a considerable savings of tape with a minimum of redundancy.

GENERAL DESCRIPTION

The video tape T1 is taken off a supply reel R1, run past a capstan 11, wound helically about a drum 13, past the capstan 11 on to a take up reel R2. Suitable tensioning means as well known in the art are utilized for reels R1 and R2.

Figure 2:
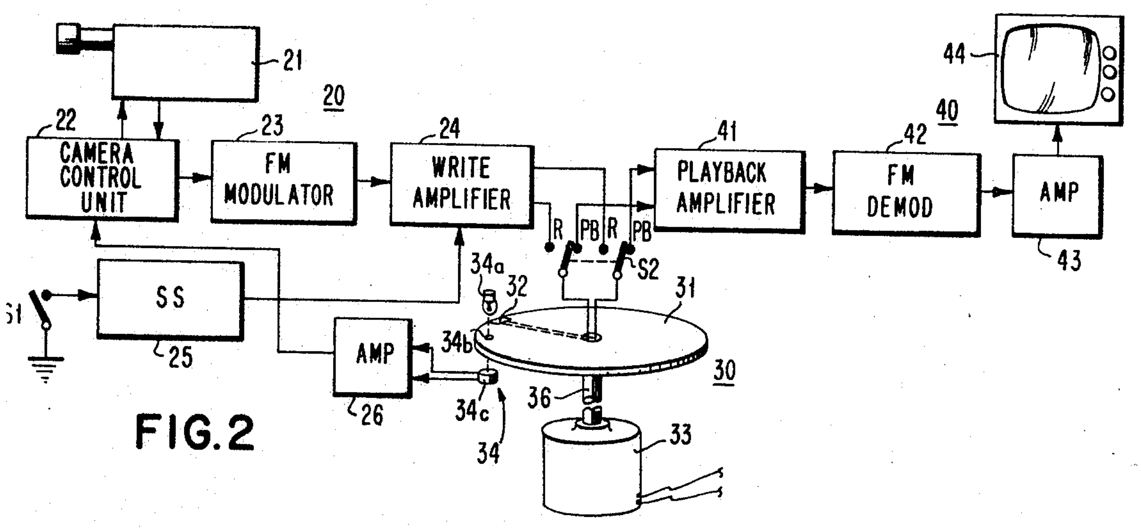
FIG. 2 is a schematic and block diagram of a video recording and reproducing apparatus according to the invention.

As set forth in FIG. 2, a single video track is applied through the video head 32 from a source of video information 20. The single track is affected by a switch S1. Selectively and most cases after this single video track (2 fields) has been recorded, audio information can be selectively applied from the source of audio 50 to the audio head 62. See also FIG. 3. This is done by closing the contacts of switch S4. By closing the contacts of switch S4 the circuit from the source of audio 50 may be closed to the audio head 62 and, in addition, an actuating means 60 is actuated to commence rotation of the audio head 62. Since the speed of the audio head 62 is only very small compared to the speed of the video head 32, no motion normally will be required of the video head, after a video track is recorded, until the audio head has completed its track. This video track, of course being parallel to the audio track or path, is effected by video head 32.

When the switch S4 is opened, the actuating means 60 is deactuated and the movement of head 62 ceases. Additionally the circuit to head 62 is open. When the audio head reaches the end of a track it is detected by a photo-detector means 64 which is effective to put a 15Kc signal burst through audio head 62 to mark the end of the track for the audio head. In addition this photo-detector is effective to put a sync mark through a sync head 77 on the bottom of the tape. Thirdly, the pulse from the photo-detector 64 increments the fixed tape T1 through a capstan 11 a predetermined distance longitudinally about the drum 13. The recording cycle then can repeat itself with a video track being recorded initially and selective audio signals continuing so long as the desired audio corresponds desirably with the corresponding video frames or pictures.

When the embodiment is conditioned for playback, the video head 32 plays back the single track with the two fields through a conventional playback system 40. The two fields (one frame) continue to be reproduced by the video reproduction system 40 and this continues until a motor 12 is actuated to increment the capstan 11 and thereby move a new video track into magnetically coupled relationship with the video head 32.

During reproduction of the video information, and during the repeating of the single frame, corresponding audio information emanates from the audio head 62 and is played back through a conventional audio output system including an amplifier 53 and a loud-speaker 54. During reproducing operation a pulse detector 90 will detect the 15kc pulses which mark the end of the audio track. Detection of these pulses results in the motor 12, driving capstan 11. The motor 12 is then deactuated upon occurance of a sink pulse previously recorded from the sync head 77.

DETAILED DESCRIPTION

Figure 1:
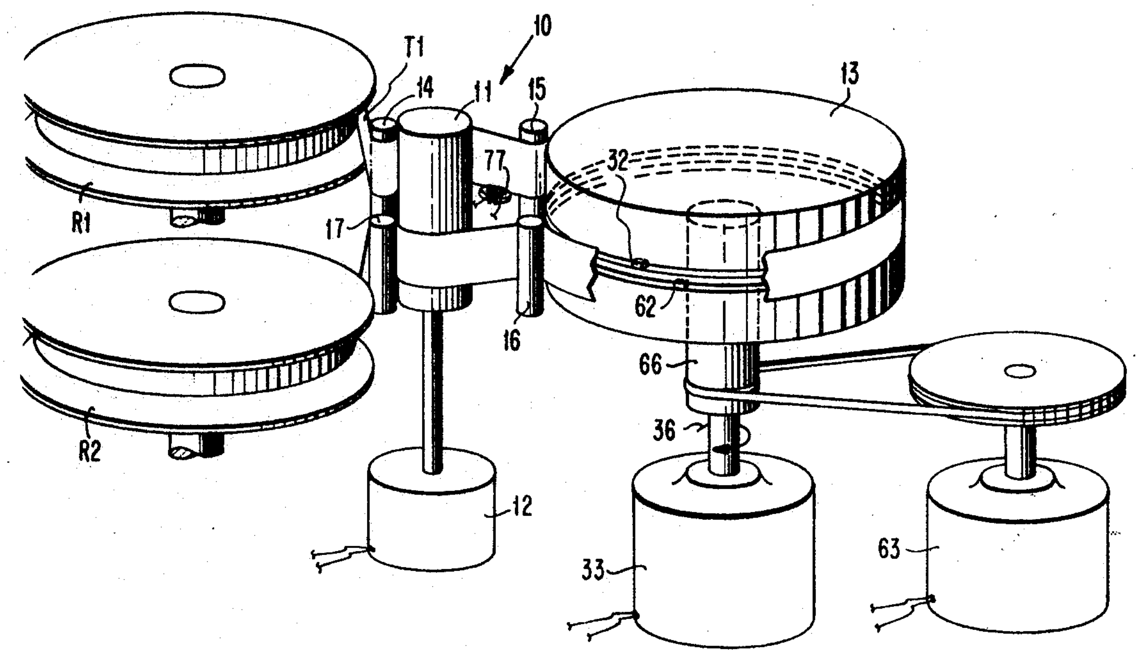
FIG. 1 is a perspective view of a video recording and reproducing apparatus embodying one form of my invention.

The recording tape T1 is taken off the supply reel R1 and threaded between pressure rollers 14 and roller 15 and the capstan 11 as shown in FIG. 1. The tape T1 is then helically wound about a drum 13 in a conventional position and thence past roller 16, capstan 11, pressure roller 17. The tape is then fed onto a take-up reel R2. The capstan 11 is driven by an incrementing printed circuit motor 12 which can be stopped and started readily to increment the tape T1 longitudinally with respect to itself, about the drum 13. A video head 32 and an audio head 62 are rotatable on the periphery of the drum 13 about 2 parallel paths.

As shown in FIG. 2 a source of video information 20 includes, for example, a T.V. vidicon camera 21 which is synchronized and driven or controlled by a conventional camera control unit 22. The composite video signal coming from the camera control unit 22 is fed to an FM modulator 23 which FM modulates the video information in a conventional manner. This information is amplified and when switch S2 is in the R or record position, is applied through amplifier 24 to a video head 32.

Figure 4:
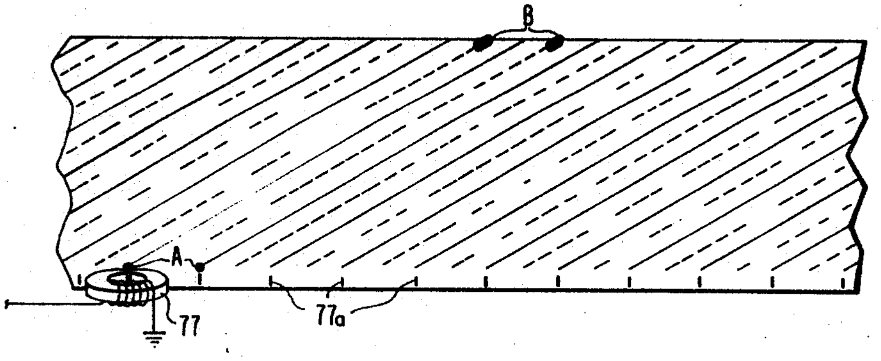
FIG. 4 is a plan view or layout of a segment of magnetic tape, to show the relative disposition thereon of audio and video tracks and sync marks, in accordance with my inventive embodiment.

The tape T1 is angularly positioned about the drum 13 so that the heads 32 and 62 first contact the tape T1, to start a video and audio track, a predetermined distance inwardly or upwardly from the lower edge of the tape, as shown in FIG. 4.

The video head 32 is part of an actuating means 30 and is mounted on a circular disk 31 which is fixedly connected to a shaft 36 that is rotated by a motor 22. A photo-detector 34 is also provided, which includes a light sensitive photo-detector element **34*a* that is fixedly connected above. Such a detector would include for example a light source 34*c* disposed below plate 31, and a hole 34*b* which is structured and in plate 31. Detector 34 is positioned so that every time the head 32 starts to scan the beginning of a video track or path, photo-detector 34*a* hole 34*b* and light source 34*c* are aligned and a pulse will be produced by detector element 34*a*, applied to the amplifier 26 and thus to the camera control unit 22 so as to develop proper synchronization signals and deflection signals for the T.V. camera 21. More specifically when the head 32 commences scan so as to produce a pulse from detector 34*a*, the camera will commence scanning of the first of two fields to be developed during one revolution of the video head 32**.

In order to produce a single frame or two fields, a video record push button s1 is employed which will actuate a single shot 25 such as monostable multivibrator, to produce a square wave which is exactly 33 milliseconds in time duration (time for one revolution of head 32). This single shot 25 is connected to the write amplifier 24 which is a form of analog gate. Amplifier 24 will be kept open for 33 milliseconds by the single shot 25 so as to produce only or to be opened for only two fields of scan and one revolution of head 32. With the switch S2 in the R or record position these two fields will be recorded during one revolution of the head 32. When they desire to produce a second picture, switch S1 is again closed and a single video track can be applied through the head 32 to the tape T1. During playback the switch S2 is put in the PB or playback position and in this position the video information is applied to the playback channel 40 which includes first, a playback amplifier 41. Amplifier 41 feeds an FM demodulator to produce a composite video analog signal that is applied to an amplifier 43 and displayed, for example, on a monitor 44.

Figure 3:
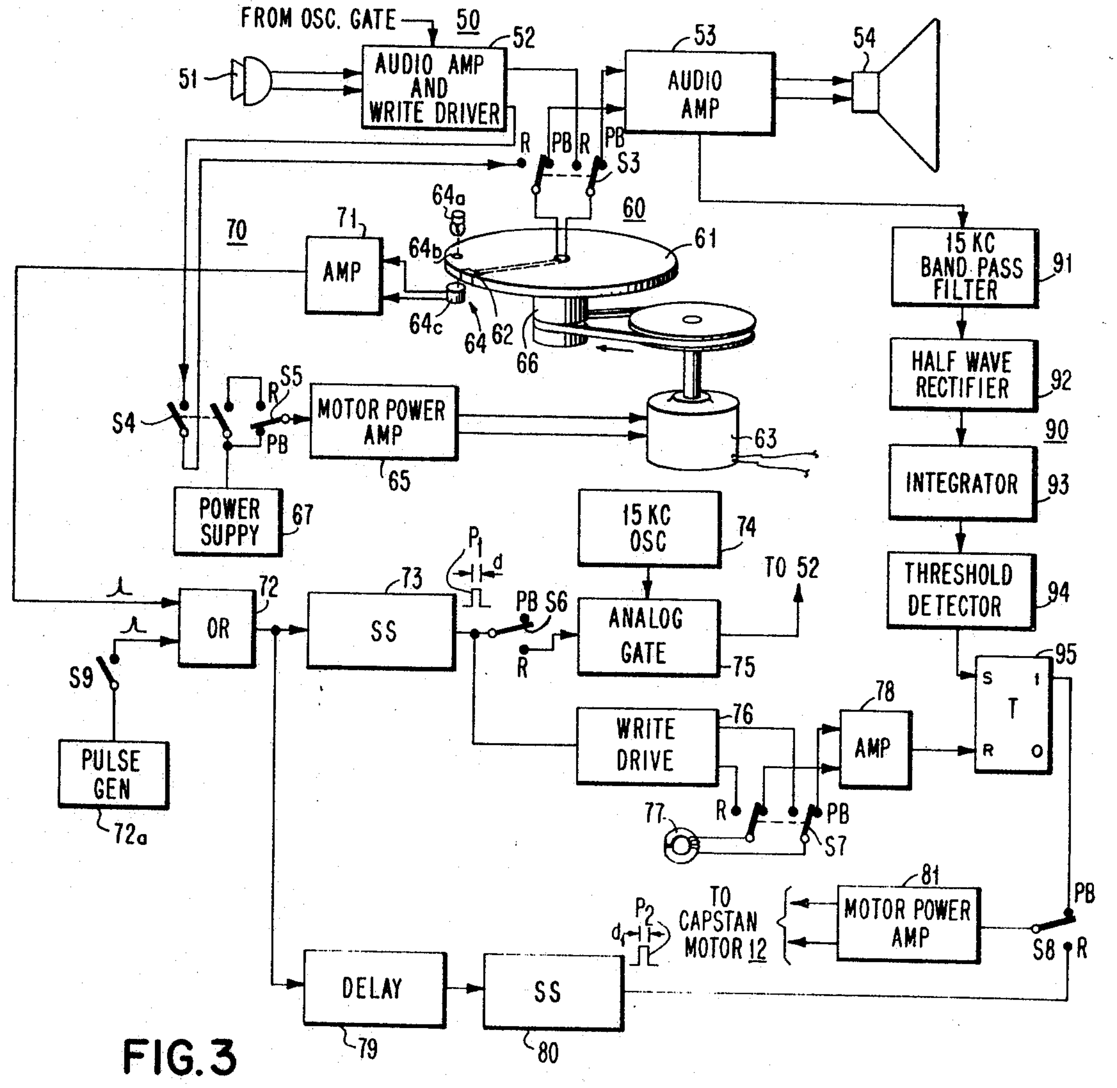
FIG. 3 is a schematic and block diagram of an audio recording and reproducing apparatus according to the invention.

The audio recording system may best be understood by viewing FIG. 3. As shown therein, this system includes a source of audio such as, for example, a microphone 51 which feeds into an audio amplifier and write printer or driver 52. With switch S3 in the record (R) position and switch S4 in closed position, an audio signal will then be applied to the head 62.

In addition, a power supply 67 will be applied through switch S5 (in record position) to a motor power amplifier 65 which actuates motor 63. Motor 63 by way of a pulley rotates shaft 66 and circular plate 61. The head 62 is mounted at the periphery of the plate 61. Plates 61 and 31 rotate clockwise, as viewed from above. It will be noted that the video head 32 rotates in a plane above and parallel to the phase of rotation of audio head 62, and the shaft 36 as shown more clearly in FIG. 1, is positioned within the cylindrical shaft 66.

As shown in FIG. 1, the preferred embodiment, the drum 13 consists of two fixed cylindrical parts, both of which are shown in FIG. 1. One cylindrical part would be located above plate 31 and the other cylindrical part would be located below plate 61, with no additional cylinder located between plates 61 and 31. Thus, leads from 34a and 64a (not shown) could be taken out between plates 31 and 61 or through the fixed cylinders.

A photo-detector 64 including a photo sensitive element **64*a* receives light through a hole 64*b* in plate 61 from a light source 64*c*. The fixedly positioned photo sensitive element 64*a* and the hole 64*b* are positioned so that when the audio head is near the end of an audio track 64*a*, 64*b* and 64*c* will be aligned and 64*a*** will produce a pulse.

FIG. 4 illustrates the tape with the dashed lines indicating the audio track and the solid lines indicating the video track. A pulse from the photo-detector 34 will occur in time at points A, which are the beginnings of the video tracks whereas a pulse from the photo detector **64*a* will occur at points B which are near the end of associated audio tracks. The sync marks effected by sync head 77 are illustrated as 77*a***.

As stated above, with switches S3 and S5 in the record (R) position, when switch S4 is opened, the left hand contact of switch S4 will open the audio signal to the head 62 and the other contact of switch S4 will discontinue the power from power supply 67 to the motor power amplifier 65 to the motor 63. Accordingly, the plate 61 will not rotate.

During the record mode with the switches S3, S5, S6, S7 and S8 in the record position and switch S4 closed, when the audio head 62 comes near the end of the track in position B, a pulse will emanate from the photo-detector 64 through an amplifier 71 and through an OR gate 72. The OR gate will drive a single shot 73 which produces a pulse P1 having a time width duration. Thus pulse is applied to analog AND gate 75 which is also fed by a 15kc oscillator 74. The output of analog AND gate 75 is applied to the audio amplifier and write printer or driver 52. Thus, when the pulse comes from a photo-detector 64 to produce pulse P1, the analog AND gate 75 is opened for a time d during which a 15kc burst is applied through gate 75 and amplifier 52 to the head 62 to produce the 15kc pulse burst when the head is at the position B or near the end of the audio track. The output of single shot 73 is also applied to a sync write driver 76 which applies this pulse through the switch S7 during record or R position, to the sync head 77 to produce a sync pulse 77*a* as shown in FIG. 4. It will be noted thus, that when the audio head comes near the end of a track a 15kc pulse is applied to the audio track and simultaneously the other end of the tape has sync pulse 77*a* recorded thereon. The pulse P1 from the OR gate 72 is also applied to a delay 79 and then to a single shot 80 which produces a pulse P2 having a time duration $d_t$. This pulse is applied through a switch S8 in its record position to a motor power amplifier 81. The power amplifier 81 drives a motor 12 which in turn drives the capstan 11. This is an incrementing type motor such as printed circuit motor which will be driven for the time duration $d_t$ by the pulse P2. Thus when the audio head reaches the end of the audio track the motor 12 will automatically increment the tape by way of the capstan 11 a predetermined distance so as to position the tape so that the audio head 62 comes into alignment with the beginning of another audio track and the video head 32 is aligned with another video track. By way of example as shown in FIG. 4 the left most solid line is a first video track and the first dotted line the first audio track. Pulse P2 will actuate motor 12 to move the tape so the head 32 will be aligned with the second solid line and head 62 with the second dotted or dashed line. Thus in this new position the video head can record a new two frames or even the same picture and a new audio track is formed.

A pulse source 72*a* is connected to a switch S9. Closure of switch S9 will produce a single relatively short time duration pulse from 72*a* that passes through OR gate 72 and thence to the delay 79. This in turn actuates the single shot 80 to produce the pulse P2 and to advance the tape the same distance as if actuated by the pulse from the photo-detector 64 occurring at the end of the audio track. In addition, before the tape moves, a 15kc pulse will be recorded and simultaneously sync mark 77*a* will be recorded. Delay 79 enables these pulses to be recorded before the tape moves in response to pulse P2. After the tape moves the video head 32 will be aligned with a new track. In addition the audio head 62 will thereupon be aligned with the next audio track and in the same position with respect to the end of the track as it was with respect to the previous audio track.

In the playback (or PB) position the switch S3 connects the audio head 62 to an audio amplifier 53 and a loud-speaker 54. The audio amplifier 53 is also connected to a detector channel 90 having a 15kc band pass filter 91. Filter 91 feeds a half-wave rectifier 92, that is connected to an integrator 93 which is connected to a threshold detector 94 and thence to an RS flip flop 95. During playback if there is a sufficient output (i.e. time and duration) from filter 91 resulting from a 15kc pulse, such that the voltage at the output of integrator 93 reaches a predetermined level, then threshold detector 94 is actuated and a "one" will appear on the S input of the RS flip flop 95 and a 1 output will then, during the playback (PB) position of S8 drive the motor amplifier 81 and thus advance the tape T1 by way of the capstan 11. In the playback position of S7 the sync head 77 is connected through the switch S7 to an amplifier 78 which in turn is connected to the RS flip flop 95. Thus, the tape is advanced until a sync mark 77*a* of the next video and audio tracks occur. This mark will reset the RS flip flop 95 so as to turn off the motor power amplifier 81 and thus stop the rotation of capstan 11 and the movement of tape T1. Only the sync mark corresponding to the next set of audio and video tracks will reset flip flop 95 to zero and stop movement of the tape. At that time heads 32 and 62 will be aligned with the next pair of tracks.

OPERATION

The composite video signal is produced by a T.V. camera 21 and a camera control unit 22. The deflection circuit of the control unit 22 and hence the camera 21 is controlled by the pulses from the photo-detector 34 so that two fields and only two fields of video information will be supplied from camera 21 for every rotation of the head 32. Appropriate sync signals for the video information are also developed by unit 22 in response to the pulses from the photo-detector 34. The resulting composite video signal is applied to the FM modulator 23. The amplifier 24 is opened for 33 milliseconds (time for one revolution of head 32) by the single shot 25 when S1 is closed to provide one complete frame (which takes 33 milliseconds) or two fields of information through the switch S2 (assuming it is in the record position) to the head 32. During this time the head 32 is being continually rotated by a motor 33. Thus, in the record position and with switch S1 closed momentarily a single picture or frame having two fields is recorded to complete one video track on the tape T1.

Further, during record position with switches S3, S4 and S5 closed (viewing FIG. 3) the motor 63 will rotate head 62, at a much slower speed than head 32, and audio signal from the microphone 51 will be applied to the audio head 62. When the switch S4 is opened, however audio from the microphone 51 will not be applied to the head 62. Additionally the power supply 67 for amplifier 65 will be disconnected by a ganged portion of switch 54 and hence head 62 won't rotate.

Under normal operation (in record position) when the head 62 comes near the end of a track, (with S4 closed), there will be a pulse from the detector 64 which will act through OR gate 72 into the single shot 73. Single shot 73, which produces only a single pulse $P_1$ having a duration *d*, will, in the record position, open the analog gate 75 to apply a 15kc burst from oscillator 74 to the head 62. This burst will occur at point B of the audio track shown in FIG. 4.

In addition to the 15kc burst, simultaneously the single shot 73 applies a pulse P to sync write driver 76, which passes through switch S7 to a sync head 77 so as to record sync mark 77*a*. In addition, at the end of the audio track, the pulse from the photo-detector 64 is applied through amplifier 71, OR gate 72 and into the delay 79 and single shot 80 to produce a pulse $P_2$ having a time duration $d_t$. This pulse is applied to the motor power amplifier 81 so as to rotate the capstan 11 a predetermined distance and advance the tape T1. The predetermined distance the tape moves, positions the tape forwardly to align the video and audio heads with the next video and audio tracks.

If it is desired to advance the tape before the end of an audio track, switch S9 maybe closed (with switch S4 closed) to provide a single pulse from this single shot pulse generator 72*a* which is applied to the delay 79, and single shot 80. This produces the same pulse P2 having a time duration $d_t$ so as to advance the tape the predetermined distance before head 62 reaches the end of the audio track. When this control is utilized the heads 32 and 62 are aligned with new tracks. Under these conditions, the audio head as well as the video head will not necessarily be near the beginning of the next track.

This pulse from the source 72 also is applied to the single shot 73, which opens the analog gate 75 for a time d so as to apply the 15kc bursts from oscillator 74 to the head 62. Such a burst may occur any place on the audio track.

In the playback position the composite video information is applied from the video head 32 through the switch S2 to playback amplifier 41. The signal is then demodulated by the FM demodulator 42 and thereafter supplied to the monitor 44 in a conventional manner. The motor 33 continually rotates the head 32 at a fixed speed so that as long as the tape T1 is held in a fixed position by capstan 11 and the pinch rollers 14 and 17, the same two fields are repeated by the video head 32 and played back through the monitor 44.

During the repetition of the video information (in playback) the power supply 67 is continually connected to the motor power amplifier 65 so that the audio head 62 normally will continually rotate and will traverse from the beginning of the first audio track to a 15kc burst. When such a burst is sensed by the head 62 through switch S3 it is applied to the audio amplifier 53 and a 15kc pulse detector 90. More specifically, the burst is applied through a 15kc band pass filter 91 to a rectifier 92, integrator 93 and to threshold detector 94. Initially flip flop 95 has a zero output. Thus, if a predetermined substantial amount of 15kc pulse signal occurs, it will set the RS flip flop 95 to a "one" output so that the drive motor power amplifier 81 drives the motor 12, thus turning capstan 11 and moving tape T1. At the next occurrence of a sync pulse 77a, however, this pulse will be passed through the switch S7, for the playback position, and amplifier 78, so as to reset the RS flip flop 95 to zero, thereby stopping the motor 12 and the consequent rotation of capstan 11. In this position the heads 62 and 32 are thus aligned with the beginning of a new video and audio track.

Only the next succeeding sync pulse can reset the flip flop 95 since due to system delay, the preceeding sync pulse will have travelled a sufficient distance beyond the sync head 77 so that it will not have sufficient effect to reset 95. Thus, the video head and the audio head continue to travel the new tracks until the audio head reaches another 15kc burst on the audio track. The capstan motor 12 is then actuated, etc.

It will be understood that in order to record the 15kc pulse burst, either automatically or by switch S1, switch S4 must be closed (with other switches in record position). In addition, the delay effected by delay 79 should be slightly longer than the time width d of pulse P. This will enable a sufficient amount of 15kc to be recorded to enable accurate detection by detector channel 90.

The time width $d_t$ of pulse $P_2$ is chosen to provide optimum spacing between tracks on tape T1.

One scheme is shown herein for longitudinally moving the tape (motor 12, capstan 11). It will be understood by those skilled in the art that other suitable means also be employed, such as disclosed that in U.S. Pat. application Ser. No. 653,782, entitled "Reproduction System" filed July 17, 1967 and now abandond in the name of E. G. Nassimbene and assigned to the same assignee as the present invention.

While the invention has been particularly shown and described with reference to preferred embodiments thereof, it will be understood by those skilled in the art that the foregoing and other changes in the form and details may be made therein without departing from the spirit and scope of the invention.

What I claim is:

1. A method of transducing a video signal and an audio signal comprising:

moving a video transducer head along a first path, at a first speed, in magnetically coupled relationship with a recording medium, and moving an audio transducer head along a second path, in magnetically coupled relationship with said recording medium, at a second speed substantially slower than said first speed, said video transducer head scanning said first path a plurality of times while said audio transducer scans said second path.

2. A method of transducing a video signal and an audio signal comprising:

moving a video transducer head along a first path, at a first speed, in magnetically coupled relationship with a recording medium, and moving an audio transducer head along a second path in magnetically coupled relationship with said recording medium, at a second speed slower than said first speed, said video transducer head being moved along said first path a plurality of times while said audio transducer head is moving along said second path.

3. A method of transducing a video signal and an audio signal as set forth in claim 1 wherein said first and said second paths are substantially parallel and obliquely disposed with respect to said recording medium.

4. A method of transducing as set forth in claim 3 comprising recording a video signal on a first track by moving said video transducer head along said first path at said first speed in magnetically coupled relationship with a fixed recording medium and recording an audio track by moving an audio transducer head along said second path in magnetically coupled relationship with said fixed recording medium at a second speed substantially slower than said first speed.

5. A method as set forth in claim 3 wherein the magnetic recording medium is an elongated magnetic tape and when said audio transducer has finished movement along said second path, said tape is moved longitudinally, again moving the video transducer along said first path at said first speed in magnetically coupled relationship, while said tape is fixed, and moving said audio transducer along said second path in magnetically coupled relationship with said tape, while said recording medium is fixed, at said second substantially slower speed than said first speed.

6. Apparatus for recording and reproducing a video signal and an audio signal comprising:

a video transducer;

an audio transducer;

a recording medium;

first actuating means for moving said video transducer at a first speed, angularly with respect to said recording medium along a first path, in magnetically coupled relationship with said recording medium while said recording medium is in a first fixed position; and second actuating means for moving said audio transducer at a second speed, angularly with respect to said recording medium along a second path, in magnetically coupled relationship with said recording medium while said medium is in said first fixed position;

said second speed being substantially slower than said first speed so that the video transducer can repetitively scan said first path while the audio transducer scans said second path.

7. Apparatus as set forth in claim 6 wherein said first and said second paths are substantially parallel.

8. Apparatus for recording and reproducing a video and an audio signal as set forth in claim 6 including advancing means for moving said recording mediums to a second fixed position, said first actuating means being operable when said recording medium is in said second fixed position to move said transducer head along said first path at said first speed to transduce a second video track, said second actuating means being operable when said recording medium is in said second fixed position to move said audio transducer along said second path in magnetically coupled relationship with said recording medium to transduce a second audio track at said second speed substantially slower than said first speed.

9. Apparatus for recording and reproducing a video and an audio signal as set forth in claim 8 including means to selectively actuate said advancing means to longitudinally move said recording medium from said first to said second fixed position.

10. A method of reproducing a video signal and an audio signal comprising:

moving a video transducer head along a first path, at a first speed, in magnetically coupled relationship with a recording medium to repetitively scan a picture recorded thereon, and moving an audio transducer head along a second path, in magnetically coupled relationship with said recording medium, at a second speed substantially slower than said first speed, so that the substantial difference in speed of movement of the video transducer head and said audio transducer head enables a single picture to be repetitively reproduced from a first track at a first speed, while also enabling audio signals recorded on a second track at a much slower speed, to be reproduced in consonance with said single picture.

* * * * *